Apr. 10, 1923.
R. P. CLARK
COVER CUSHION FOR FRUIT BASKETS
Filed Aug. 28, 1922
1,450,911
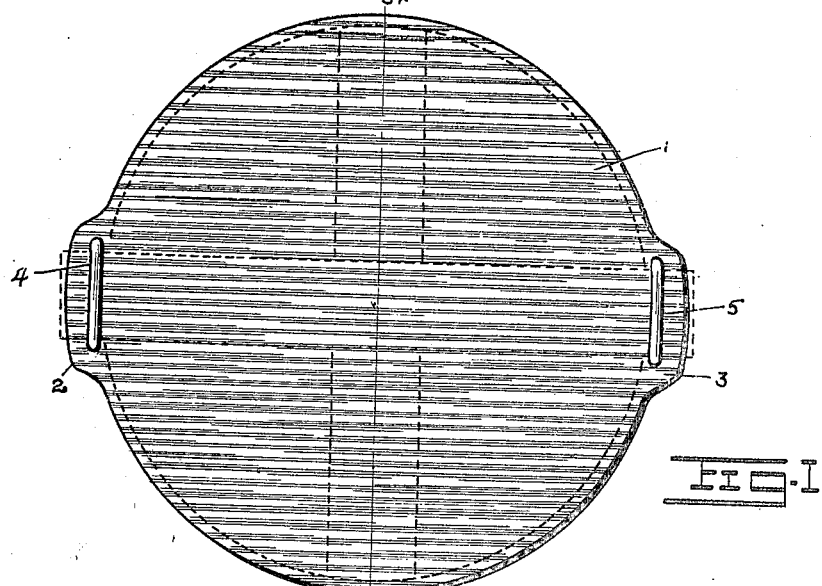
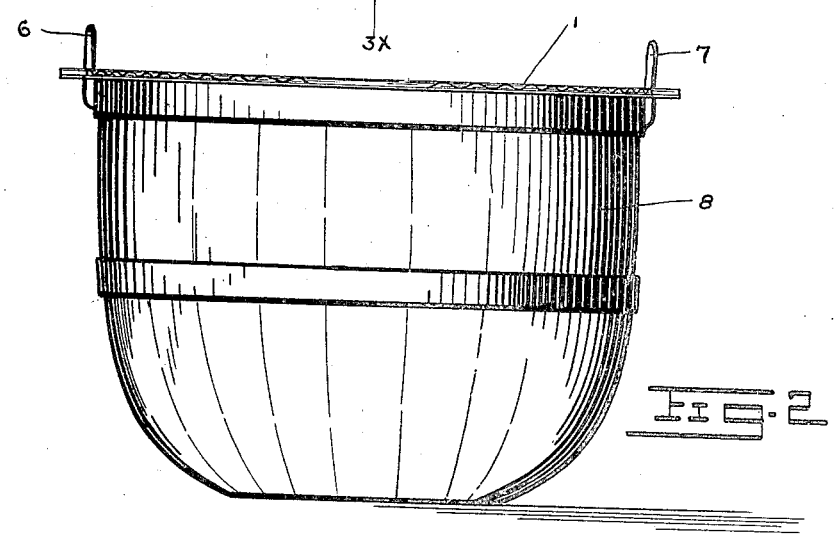
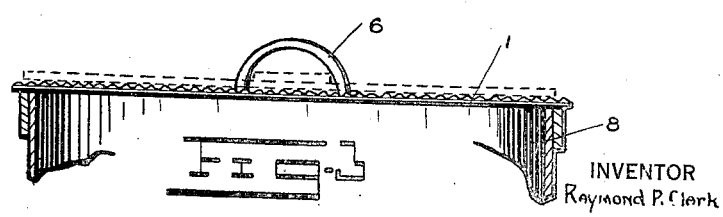
INVENTOR
Raymond P. Clark
BY
*Frank Keiper*
ATTORNEY Patented Apr. 10, 1923.

1,450,911

UNITED STATES PATENT OFFICE.

RAYMOND P. CLARK, OF ROCHESTER, NEW YORK.

COVER CUSHION FOR FRUIT BASKETS.

Application filed August 28, 1922. Serial No. 584,735.

*To all whom it may concern:*

Be it known that I, RAYMOND P. CLARK, a citizen of the United States, residing at Rochester, in the county of Monroe and State of New York, have invented certain new and useful Improvements in Cover Cushions for Fruit Baskets, of which the following is a specification.

The object of this invention is to provide a fruit cover cushion with means for locking it in place on top of fruit baskets independently of the cover of the basket and thus prevent its slipping out between the cover and the top of the basket.

This and other objects of this invention will be fully illustrated in the drawing, described in the specification and pointed out in the claims at the end thereof.

In the accompanying drawing:

Figure 1 is a top plan view of the fruit cover cushion as it appears when placed on top of a fruit basket.

Figure 2 is a side elevation of a fruit basket with the fruit cover cushion placed on top of the basket.

Figure 3 is a transverse sectional view of the fruit cover cushion, the section being taken on the line $3^x$—$3^x$ of Figure 1.

In the several figures of the drawing like reference numerals indicate like parts.

Fruit cover cushions are placed on top of a fruit basket and are interposed between the top layer of fruit and the cover of the basket. This is to cushion the pressure of the cover on the fruit to prevent the bruising of the fruit by the cover. These cover cushions have heretofore been loosely laid on top of the fruit so that all that kept them in place was the pressure of the cover thereon. Many times this is not sufficient to hold the cover cushion in place and the cushion works out from under the cover. Then again the cushion may not be centered properly to begin with so that the fruit is not protected by the cushioning effect of the cover cushion at least not at all points.

All this is eliminated by making the cover cushion in accordance with my invention hereinafter described and illustrated in the drawing. The cover is made up of a pad 1 of corrugated board practically circular in outline. At two diametrically opposite points the perimeter of the cover is slightly enlarged to form a pair of handles 2 and 3 thereon. A short distance from the outer edges of these handles the cover is perforated with a pair of slots 4 and 5 respectively which slots are parallel with each other and at right angles to the corrugations of the cover cushion.

In forming the handles 2 and 3 and the slots 4 and 5 at right angles to the corrugations of the cover the handles retain a certain amount of their rigidness that holds them to project out from the edge of the cover. This is necessary because in placing the cover cushions the handles thereof must be rigid so that they can be taken hold of to center the cover cushion on the top of the basket until the handles 6 and 7 of the basket 8 can slip through the slots 4 and 5 respectively.

After the handles 6 and 7 have slipped through the slots in the cover cushion they hold the cover cushion in place on top of the cover cushion in the usual manner and locked in place on top of the cover cushion by slipping the ends of the center slat of the cover through the handles as illustrated in dotted lines in Figure 1. This then holds the cover and the cover cushion in place on the basket and prevents its coming off vertically while the engagement of the handles into the slots in the cushion cover prevents its dislocation thereof horizontally.

I claim:

1. A cover cushion for fruit baskets, comprising a pad, horizontal extensions formed at two diametrically opposite points on the periphery of said pad to form a pair of handles for said pad, said handles having slots provided therein into which the handles of a fruit basket can engage to hold the cover cushion in place on top of the basket.

2. A cover cushion for fruit baskets, comprising a pad, horizontal extensions formed at two diametrically opposite points on the periphery of said pad to form a pair of handles for said pad, said handles having slots provided therein into which the handles of a fruit basket can engage to hold the cover cushion in place on top of the basket, corrugations formed on top of said cushion and at right angles to the slots in said handles.

3. A cover cushion for fruit baskets, comprising a pad, having a smooth surface at the bottom and a corrugated surface at the top, said pad having a slot formed therein at two diametrically opposite points near the edge of the pad and at right angles to the corrugations at the top of the pad.

4. A cover cushion for fruit baskets comprising a pad, means provided at two diametrically opposite points near the edge of the pad with which the handles of a fruit basket can engage to lock said pad against lateral movement on top of a fruit basket.

In testimony whereof I affix my signature.

RAYMOND P. CLARK